May 30, 1950          A. T. WHITE          2,509,851
SIGNALING MECHANISM FOR DRINKING VESSELS
Filed Dec. 16, 1948
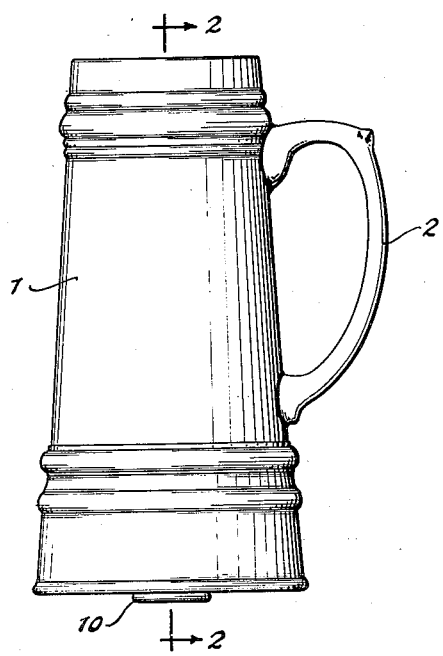
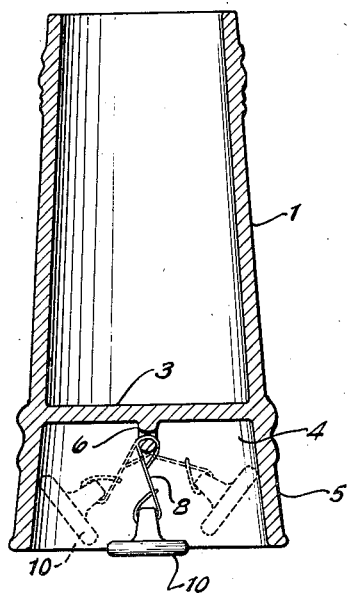
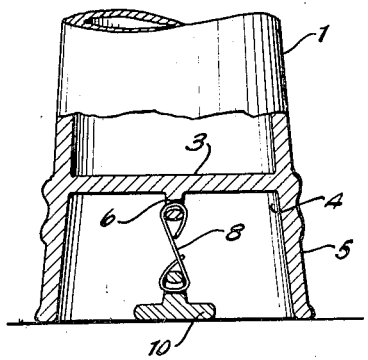
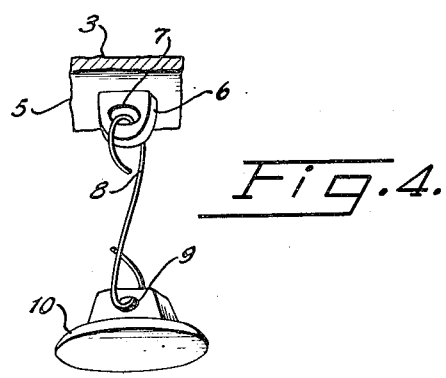
Inventor
Allan Thomson White
By Albert H. Kirchner
ATTORNEY Patented May 30, 1950

2,509,851

UNITED STATES PATENT OFFICE 2,509,851

SIGNALING MECHANISM FOR DRINKING VESSELS

Allan T. White, East Palestine, Ohio, assignor to Fitzpatrick Industries, Inc., East Palestine, Ohio, a corporation of Ohio Application December 16, 1948, Serial No. 65,556

2 Claims. (Cl. 116—155)

The present invention relates to vessels from which beverages may be drunk or foods may be eaten, and more particularly to vessels of the tankard, beer stein or mug type adapted primarily to be used in bars, taverns, restaurants and other public places in connection with the on-sale drinking of beer.

A principal object of the invention is to provide a unique and attractive vessel of the types indicated which will include novel structure by which the user may signal that the contents of the vessel have been consumed.

A more specific object of a preferred form of embodiment of the invention is to provide a practical and attractive beverage vessel of the mug or stein type which will contain concealed means which can be operated at will by the user to produce a distinctive sound so as to signal to a waiter, bartender or the like that the customer holding the vessel wishes to be re-served.

Another object is to incorporate such signaling means in the vessel in such a way that the means is concealed and the appearance of the vessel is no different from that of an ordinary conventional beer stein or mug.

With the foregoing and other objects in view, a preferred embodiment of the invention is shown in the accompanying drawing in which Figure 1 is a side elevational view of a drinking vessel made in accordance with the invention;

Fig. 2 is a vertical sectional view of the vessel held free of any support;

Fig. 3 is a detail vertical sectional view of the lower portion of the vessel, shown resting on a table or similar supporting surface; and Fig. 4 is a detail perspective view of the operating element of the signaling means.

Generally speaking, the invention comprises providing an elevated bottom in a drinking vessel which is made otherwise in the shape of a conventional beer mug or stein, so that a chamber is formed between the bottom and the lower edge of the vessel, and hanging a clapper, somewhat like that of a bell, in the chamber, so that when the vessel is inclined or swung from side to side the clapper will swing and strike against the side of the chamber and emit a sound.

As shown in the preferred embodiment which is illustrated in the drawing, the vessel may be made generally in the manner common to beer mugs, so as to have the usual cylindrical or upwardly slightly tapered side wall 1 and side handle 2. Instead of having its bottom wall at the level of the lower edge of the side wall 1, the new vessel has its bottom 3 elevated an appreciable distance above the lower edge of the side wall so as to provide a chamber 4 defined by the bottom 3, which forms the roof of the chamber, and the lower portions of the side wall 1, which constitute a sort of skirt 5 acting as the side of the chamber 4.

The vessel may be made in one piece of glass, pottery or the like as is usual in this class of drinking vessels, or it may be made of metal or any other suitable material. The center of the bottom 3 is enlarged to provide a boss 6 depending into the chamber 4, and this boss is perforated, as shown at 7, to receive the loop of a relatively stiff wire 8 which hangs freely in the chamber and has its lower end turned and bent through the eye or perforation 9 of a clapper 10. The clapper is conveniently cast of the same sort of material as that of which the vessel itself is made, but it may be formed of any suitable solid material that can easily be cast or otherwise made into substantially the shape best shown in Fig. 4. The important features of this shape are the combination of an upper portion which receives the wire 8 and a lower portion, best made flaring, for making striking impact with the skirt 5, as indicated by the broken lines in Fig. 2, when the clapper is swung in the chamber.

The proportions of the clapper 10 and the wire 8 with relation to the size of the chamber 4 are such that when the vessel is held in the hand and swung from side to side the clapper will swing into striking contact with the side wall of the chamber and emit a sound.

In order to keep the clapper silent when the vessel is set on a table or other horizontal surface, the length of the wire 8 is made of a length relative to the height of the chamber 4 that will be appreciated from a comparison of Figs. 2 and 3. This length is such that when the vessel is held in the hand, and unsupported by any table or analogous surface, the clapper will hang down below the bottom edge of the skirt 5, but when the vessel is set on a table or the like the clapper will come to rest on the surface before all parts of the skirt edge do, and the clapper will thus be held motionless, against any tendency to swing and emit a sound.

It is convenient to effect this arrangement by making the openings 7 and 9 much larger than the diameter of the wire 8. In this way, when the clapper settles on a supporting surface, moving from the position shown in full lines in Fig. 2 to the position shown in Fig. 3, the clapper will move up on the wire, with the wire settling down into the bottom of the opening 9, and thereafter, further lowering of the vessel to bring the lower edge of its skirt 5 to rest on the supporting surface will cause the upper end of the wire 8 to move up toward the top of the opening 7 in the boss 6. This is the final position of the parts at rest, as shown in Fig. 3. This relationship of the parts insures silence of the clapper.

This silencing of the supported vessel can be insured without arranging the clapper to hang normally below the level of the lower edge of the skirt 5 and causing it to be elevated slightly on coming into contact with the supporting surface. In the alternative, the clapper may be designed to hang freely with its bottom surface in the plane of the lower edge of the skirt 5, or even slightly above that plane, as long as the width of the bottom surface of the clapper is great enough to bring an edge of the clapper into contact with the supporting surface, and thus stop further swinging movement of the clapper, should swinging movement be begun by movement of the vessel on the supporting surface.

When it is desired to signal a waiter or the like, the vessel is simply lifted by means of the handle 2 and is rocked slightly from side to side, thus swinging the clapper through the positions shown in Fig. 2 so that it strikes against the skirt 5 and produces a characteristic sound. Since the purpose of thus signaling is to indicate that the vessel is empty or nearly empty, the vessel is not swung when full or nearly full, and there is consequently no danger of spilling any contents by the swinging movement. It may be desirable to proportion the capacity of the vessel in such a way that it will be full or nearly full when the customary quantity of beer or the like constituting a standard sale is put into it. This insures reasonably careful handling of the full vessel, so that accidental or undesired sounding of the clapper is not likely to take place.

It has been found in actual practice that use of the vessel hereinabove described has considerable appeal to customers at bars, restaurants, and the like and stimulates the sale of beverages by making it easy and interesting for the customers to signal their desire to reorder.

While the invention has been illustrated and described in terms of its embodiment in a drinking vessel of the stein or mug type for use in restaurants, bars, taverns and the like, it will be obvious that the principles of the invention may equally well be incorporated in other kinds of vessels, for example in bowls for containing food, and in vessels adapted to be used in the home or in places other than public establishments, for example in bowls, mugs and such vessels used by babies or small children. The latter embodiments of the invention are peculiarly well adapted to encourage mealtime eating and drinking by small children whose appetites at times are dull and require stimulating or who are sometimes given to trifling and wasting time at the table or in the high chair. The novelty of being able to lift the vessel and sound the clapper as a signal that the food or beverage contents have been entirely consumed will in many cases inspire an otherwise diffident child to finish his meal with gratifying alacrity.

All such embodiments of the invention are of course contemplated within the scope of the appended claims, in which the expression "drinking vessel" is used generically, and as typical and representative of all the fields of use to which the invention may be usefully put, and without any intention of limiting the field of use to containers for beverages as distinguished from foods. Moreover, it is to be understood that numerous other details of the disclosed embodiment of the invention may be varied without departing from the principles of the invention as defined by the claims.

I claim:

1. In a drinking vessel of the beer stein type, a side wall terminating in a lower edge, a bottom connected to the side wall above said lower edge to form with the side wall a chamber having a closed top and an open bottom, an eye formed in the top of the chamber, a clapper having a flat bottom and having at its top an eye, and a wire connecting said eyes, said wire being long enough to hang the clapper normally below the lower edge of the side wall for swinging into audible striking contact with the side wall when the vessel is held up and shaken and the wire having such clearance in at least one of the eyes that the clapper will be pushed up to the level of said lower edge without bending the wire or angularly moving it when the vessel is set with its lower edge on a supporting surface such as a table and the flat bottom of the clapper rests on said surface.

2. In a drinking vessel of the beer stein type, a side wall terminating in a lower edge, a bottom connected to the side wall above said lower edge to form with the side wall a chamber having a closed top and an open bottom, an eye formed in the top of the chamber, a clapper having a flat bottom and having at its top an eye, and a wire connecting said eyes so as to hang the clapper for swinging into audible striking contact with the side wall when the vessel is held up and shaken, said wire being long enough to hang the flat bottom of the clapper in a horizontal plane so related to the plane of the lower edge of the side wall that when said lower edge is set on a supporting surface such as a table or the like no bending stress will be applied to the wire and said supporting surface will be engaged by the flat bottom of the clapper and will prevent the clapper swinging into striking contact with the side wall of the vessel.

ALLAN T. WHITE.

REFERENCES CITED

The following references are of record in the file of this patent:

UNITED STATES PATENTS

| Number | Name | Date |
|---|---|---|
| 116,241 | Volger | June 20, 1871 |
| 419,767 | Goff | Jan. 21, 1890 |
| 623,589 | Worns | Apr. 25, 1899 |
| 781,846 | Neahr | Feb. 7, 1905 |
| 801,564 | Allen et al. | Oct. 10, 1905 |
| 862,379 | Banford | Aug. 6, 1907 |
| 1,505,155 | McKenzie et al. | Aug. 19, 1924 |
| 1,774,126 | Brimer | Aug. 26, 1930 |

FOREIGN PATENTS

| Number | Country | Date |
|---|---|---|
| 30,443 | Norway | Feb. 16, 1920 |